United States Patent
Shamir et al.

(10) Patent No.: US 9,508,006 B2
(45) Date of Patent: Nov. 29, 2016

(54) SYSTEM AND METHOD FOR IDENTIFYING TREES

(71) Applicant: Intelescope Solutions Ltd., Petach-Tikva (IL)

(72) Inventors: Gil Shamir, Kfar-Saba (IL); Michael Moyal, Petach-Tikva (IL); Erez Yaacov Diamant, Herzelia (IL)

(73) Assignee: Intelescope Solutions Ltd., Petach-Tikva (IL)

( * ) Notice: Subject to any disclaimer, the term of this patent is extended or adjusted under 35 U.S.C. 154(b) by 0 days.

(21) Appl. No.: 14/530,852

(22) Filed: Nov. 3, 2014

(65) Prior Publication Data

US 2016/0125222 A1    May 5, 2016

(51) Int. Cl.
  *G06K 9/00*  (2006.01)
  *G06K 9/62*  (2006.01)

(52) U.S. Cl.
  CPC ........... *G06K 9/0063* (2013.01); *G06K 9/6218* (2013.01)

(58) Field of Classification Search
  None
  See application file for complete search history.

(56) References Cited

U.S. PATENT DOCUMENTS

| | | | | |
|---|---|---|---|---|
| 5,764,819 A * | 6/1998 | Orr | ........................ | A01G 7/00 348/144 |
| 6,731,788 B1 * | 5/2004 | Agnihotri | ......... | G06F 17/30796 194/206 |
| 7,212,670 B1 * | 5/2007 | Rousselle | ............ | G06K 9/0063 382/173 |
| 7,639,842 B2 * | 12/2009 | Kelle | ..................... | G01C 11/00 382/109 |
| 7,917,346 B2 * | 3/2011 | Sullivan | ............. | G06K 9/00657 382/108 |
| 8,208,689 B2 * | 6/2012 | Savolainen | ........... | G06K 9/0063 382/110 |
| 8,467,572 B2 * | 6/2013 | Park | .................... | G06K 9/00771 382/103 |
| 8,897,483 B2 * | 11/2014 | Ram | ..................... | G06Q 10/087 382/100 |
| 2008/0008349 A1 * | 1/2008 | Binnig | ............... | G06K 9/00127 382/100 |
| 2009/0226033 A1 * | 9/2009 | Sefcik | .................. | G06K 9/3233 382/103 |
| 2010/0322477 A1 * | 12/2010 | Schmitt | .................... | G01S 17/00 382/103 |
| 2011/0085738 A1 * | 4/2011 | Kitamura | ................ | G06T 5/002 382/199 |
| 2013/0058524 A1 * | 3/2013 | Cohen | ................ | G06K 9/00134 382/103 |
| 2013/0201334 A1 * | 8/2013 | C | ........................ | G06K 9/00818 348/148 |
| 2014/0099000 A1 * | 4/2014 | Shamir | ............. | G06K 9/00657 382/110 |
| 2014/0334667 A1 * | 11/2014 | Eswara | ............. | G06K 9/00637 382/103 |

OTHER PUBLICATIONS

Walsworth et al ("Comparison of Two tree apex delineation techniques", 1998).*
Palenichka et al ("Multiscale Isotropic Matched Filtering for Individual Tree Detection in LiDAR Images", 2007).*

* cited by examiner

*Primary Examiner* — Avinash Yentrapati
(74) *Attorney, Agent, or Firm* — Pearl Cohen Zedek Latzer Baratz LLP (57) ABSTRACT

A system and method of detecting trees in an image. A system and method may receive a dimension related to the trees in an input image. A two dimensional (2D) high pass filter may be applied to the input image to produce a high pass image. Objects may be marked in the high pass image based on the dimension. A processed image may be produced by associating a set of pixels in the high pass image with a respective set of grayscale values. A density operator may be applied to the processed image to identify locations with high frequency changes. Shapes may be defined to include the locations. Trees may be identified by grouping one or more shapes.

18 Claims, 7 Drawing Sheets
(3 of 7 Drawing Sheet(s) Filed in Color)

SYSTEM AND METHOD FOR IDENTIFYING TREES

FIELD OF THE INVENTION

The present invention relates generally to identifying objects in an image. More specifically, the present invention relates to methods, devices and systems for identifying trees and areas with trees in an image.

BACKGROUND OF THE INVENTION

Some systems and methods for identifying objects in an image are known. For example, methods for identifying objects in an image based on color variations are known. Other systems and methods use intensity values of pixels in order to identify objects. Although known systems and methods may enable identifying objects in images where the objects are clearly distinguished from their background, there is a need in the industry for a system and method that enable detecting objects in an image which are visually, similar to the background of the image.

SUMMARY OF THE INVENTION

A system and method of detecting trees in an image are disclosed herein. A system and method for detecting trees in an image may include providing an input image of an area with trees; receiving at least one dimension related to the trees; applying a two dimensional (2D) high pass filter to the input image to produce a high pass image, wherein the 2D high pass filter is configured to mark objects based on the at least one dimension; and identifying trees in the high pass image by identifying clusters of marked objects. A dimension related to the trees may be a size of leaves.

A system and method for identifying trees in an image may include receiving a first dimension related to a first tree type and a second dimension related to a second tree type; applying the two dimensional (2D) high pass filter to the input image to produce a high pass image, wherein the 2D high pass filter is configured to detect objects based on the first dimension and based on the second dimension; and identifying, in the high pass image, trees of the first type and trees of the second type by respectively identifying clusters of objects related to the first tree type and clusters of objects related to the second tree type.

A system and method for marking trees in an image may include producing a processed image by associating a set of pixels in the high pass image with a respective set of grayscale values, the grayscale values selected based on respective magnitudes of color variations around the set of pixels; applying a density operator to the processed image to identify locations with high frequency changes and marking the centers of the locations; defining shapes around the centers of the locations; and identifying canopies by grouping two or more shapes.

A system and method may include receiving a color signature related to the trees and verifying the shapes correlate with trees in the input image using the color signature. A system and method may include identifying planted areas by defining polygons enclosing two or more of the shapes.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

It will be appreciated that, for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

The term "image" and types of images (e.g., grayscale image, gray level image, high pass image etc.) as referred to herein may relate to a digital representation of an image as known in the art. For example, an image as referred to herein may be a set or array of pixels (e.g., sets of values stored in a file where each set represents a pixel), each pixel represented by a set of values, parameters or attributes, e.g., an intensity value, a color parameter or any other imaging attributes, values or parameters. The terms "grayscale" and "gray level" are known in the art and may be used herein interchangeably.

Figure 1:
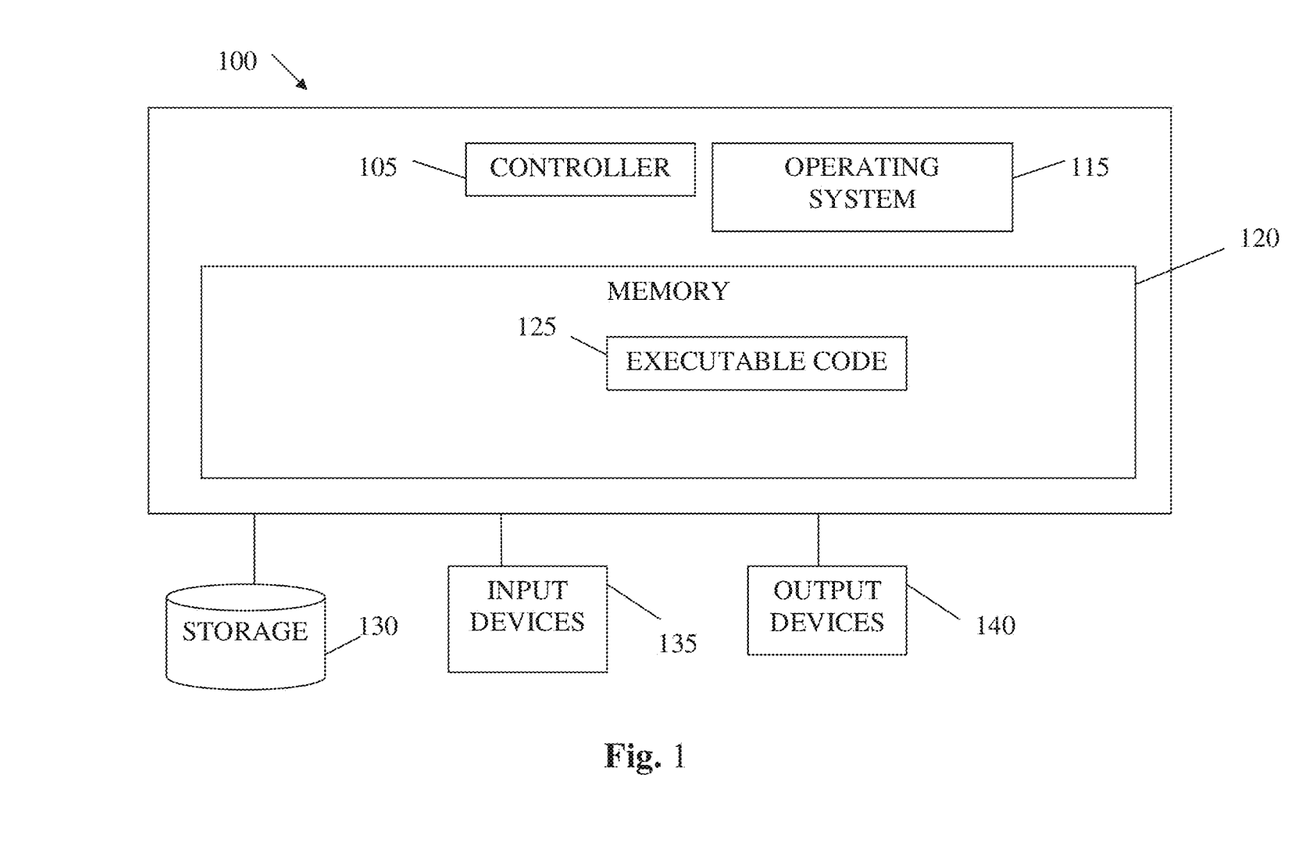
FIG. 1 shows a high level block diagram of an exemplary computing device according to some embodiments of the present invention.

Reference is made to FIG. 1, showing a high level block diagram of an exemplary computing device according to some embodiments of the present invention. Computing device 100 may include a controller 105 that may be, for example, a central processing unit processor (CPU), a chip or any suitable computing or computational device, an operating system 115, a memory 120, a storage 130, input devices 135 and 1 output devices 140.

Operating system 115 may be or may include any code segment designed and/or configured to perform tasks involving coordination, scheduling, arbitration, supervising, controlling or otherwise managing operation of computing device 100, for example, scheduling execution of software programs or enabling software programs or other modules or units to communicate. Operating system 115 may be a commercial operating system. Accordingly, modules or units that include (or share) at least controller, memory 120 and executable code 125 as described herein may readily communicate, share data and otherwise interact.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer or processor non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be an application that identifies trees in an image and/or identifies planted regions as further described herein.

Storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit. Content may be stored in storage 130 and may be loaded from storage 130 into memory 120 where it may be processed by controller 105. For example, an image may be stored in storage 130 and may be loaded therefrom into memory 120 where it may be examined and processed by controller 105. In some embodiments, some of the components shown in FIG. 1 may be omitted. For example, memory 120 may be a non-volatile memory having the storage capacity of storage 130. Accordingly, although shown as a separate component, storage 130 may be embedded or included in memory 120.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays, speakers and/or any other suitable output devices. It will be recognized that any suitable number of output devices may be operatively connected to computing device 100 as shown by block 140. Any applicable input/output (I/O) devices may be connected to computing device 100 as shown by blocks 135 and 140. For example, a wired or wireless network interface card (NIC), printer, a display, a universal serial bus (USB) device or external hard drive may be included in input devices 135 and/or output devices 140.

Some embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, a storage medium, such as memory 120, computer-executable instructions, such as executable code 125, and a controller, such as controller 105.

A system according to some embodiments of the invention may include components such as, but not limited to, a plurality of central processing units (CPU) or any other suitable multi-purpose or specific processors or controllers, a plurality of input units, a plurality of output units, a plurality of memory units, and a plurality of storage units. A system may additionally include other suitable hardware components and/or software components. In some embodiments, a system may include or may be, for example, a personal computer, a mobile computer, a laptop computer, a server computer, a network device, or any other suitable computing device.

A system, modules or units described, or referred to herein, may include elements included in device 100 described herein. For example, a system that detects trees in an image as described herein may include a controller 105, a memory 120, and an executable code 125.

A plurality of executable code segments similar to executable code 125 may be loaded into memory 120 and executed by controller 105. For example, a system that detects trees in an image as described herein may include detection module that applies a two dimensional (2D) high pass filter to the input image, a density module that applies a density operator to an image, and a verification module that verifies detected canopies or trees.

A system and a method according to some embodiments of the invention may identify objects in an image. For example, a system and/or a method according to embodiments of the invention identify trees in an image. A system and a method according to embodiments of the invention may identify planted areas or areas with trees and may identify and mark segments (or areas or portions) in an image where trees are found.

In particular and as described herein, in some embodiments, a method carried out by a system may be invariant under, or unaffected by, color variations in an input image. Accordingly, a system and method according to some embodiments of the invention may enable identifying trees and/or areas of trees in locations where trees and their surrounding environment share the same color.

Figure 2:
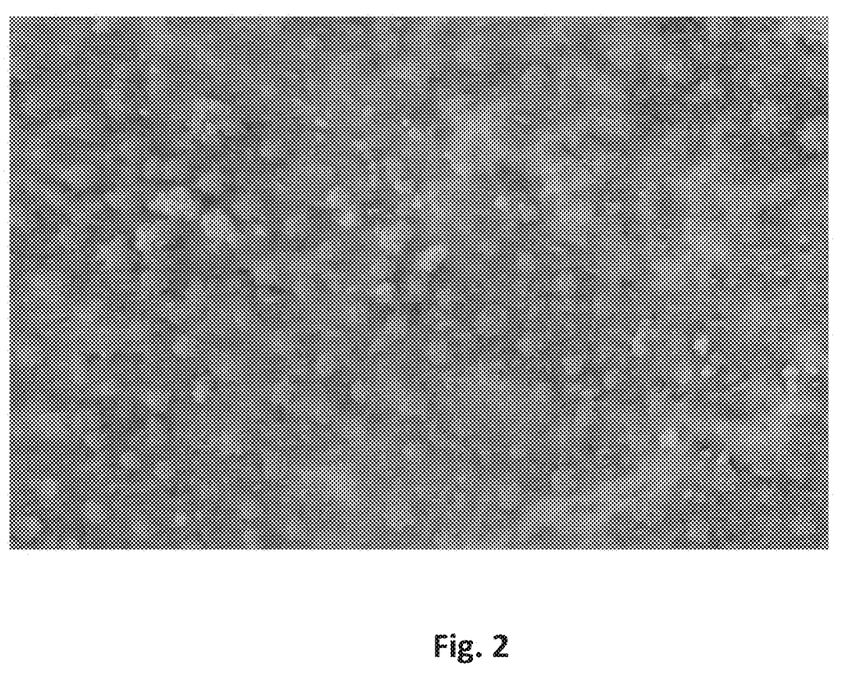
FIG. 2 shows an exemplary input image according to some embodiments of the present invention.

A system and method may receive or obtain an input image. For example, an input image may be an image of a forest or any other area with trees. Reference is made to FIG. 2 that shows an exemplary input image. As shown by FIG. 2, an input image may include trees and their surroundings that may have similar colors. For example, an input image as shown by FIG. 2 may be a color image of an area with trees and may be used as an input to a system and/or method as described herein.

A system and a method according to some embodiments of the invention may receive an input image, use a high pass filter to detect high frequency changes in the input image and assign, to each pixel in an image, a gray level value that represents the magnitude of a frequency change (detected by the filter) near or around the pixel. In an embodiment, the filter is configured to match a dimension of specific object. For example, in one embodiment, the filter is configured to match the dimension of leaves in a specific tree.

A system and method may detect, in an input image, locations with potential leaves in an image. For example, a system and method may include applying a two dimensional (2D) high pass filter to an input image to produce an output (or processed) image referred to herein as a high pass image. The 2D high pass filter may be configured to match a dimension of leaves in trees shown in the input image. For example, if the type of trees in the area captured by the input image is known, then the 2D high pass filter is configured to match a dimension of clusters of leaves in the specific type of trees. Other attributes of a specific tree type may be taken into account when configuring the 2D high pass filter. For example, clusters of leaves in a first tree type may be different in size and shape from clusters of leaves in a second tree type. Configuring the 2D high pass filter may be done using information related to the type, age, condition or other parameters of the trees in question.

The 2D filter may use a window for processing images. For example, a window defined by 9×9 pixels may be used. For example, a set of pixels included in a 9×9 pixel window may be examined and/or processed by the filter, then, the window may be translated or shifted over the image such that a new set of pixels is included in the window and so on. Accordingly, the 2D filter may use a sliding window. A sliding window as referred to herein may be as known in the computer science art. Generally, a sliding window is a technique for iteratively processing portions of content. For example, a sliding window of 16×16 pixels may be repeatedly or iteratively translated or shifted (e.g., by a processor as described herein) over an image and the pixels included in the window, in each iteration, may be examined and/or processed (e.g., by the processor). A sliding window or other method may be used, by the 2D filter, in order to generate an output (or processed) image as described herein.

The window used by the 2D filter may be configured according to any applicable parameter. For example, a window size of a 2D filter may be set larger for smoothed images (e.g., images that were generated by smoothing an original image) and the window may be set to a smaller size when the 2D filter is applied to an image that includes small objects, e.g., an image of trees with narrow leaves. A 2D window size may be set based on the size of leaves. For example, if the type and/or condition of trees in an image are known then their leaves' size may also be known and a window size of a 2D filter may be set according to a typical or average leave size. Accordingly, to configure a 2D filter to detect and mark objects based on the at least one dimension, a window size used by the filter may be set such that it matches the dimension of the objects being searched for. A system and method may identify trees in a high pass image by identifying clusters of marked objects. For example, by setting the window size such that it matches the size of leaves of a specific type or tree, presence of trees (of the specific type) may be determined by identifying clusters of leaves on those trees.

A presence of two or more types of trees, in the same area or image, may be detected. For example, a first and second dimension may be received (e.g., the sizes of leaves of two different tree types may be provided). A 2D filter may be configured to process an image using a first and then a second window size that match the first and second dimensions. Using two window sizes, the 2D filter may identify, in the high pass image, trees of the first type and trees of the second type by respectively identifying clusters of objects (e.g., leaves or branches) related to the first tree type and clusters of objects related to the second tree type.

Figure 3:
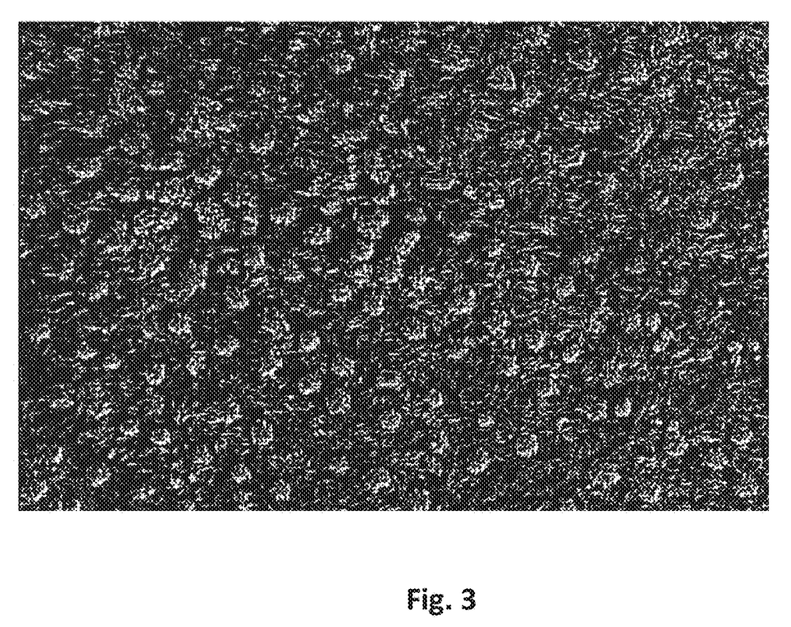
FIG. 3 shows an exemplary processed image according to some embodiments of the present invention.

Reference is made to FIG. 3 that shows an exemplary output (or processed) image produced by a 2D high pass filter according to some embodiments of the invention. As shown by FIG. 3, locations where meaningful, local, color variations exist in an input image (e.g., in the image shown in FIG. 2) are indicated by white patterns and locations where no meaningful color variations or changes are present are set to black.

A system and method may associate a set of pixels in the high pass image with a respective set of grayscale (or gray level) values, the grayscale values each selected based on a magnitude of color variation around the relevant pixel. Accordingly, in an embodiment, a grayscale value associated with a pixel represents the magnitude of color variation around the pixel. Otherwise described, each pixel is assigned a gray level which corresponds to the amount of image color's difference in its location. For example, in an embodiment, grayscale values are set such that higher grayscale levels or values indicate (or show) meaningful, local, color variations. For example, using values between "0" (to indicate black) and "255" (to indicate white), the higher the grayscale value assigned to, or associated with a pixel, the brighter the pixel is. Accordingly, a method described herein will cause pixels where meaningful, local, color variations exist to be relatively brighter compared to pixels in locations with no color change or variation.

A system and a method according to some embodiments of the invention may identify or locate potential clusters of leaves. For example, a density operator may be configured to match a preconfigured size or shape of a set of leaves in a tree. A density operator may be applied to an output of the high pass filter to identify or detect potential sets of leaves. Generally, potential or candidate clusters (or sets) of leaves may be regions or areas in an image where the probability that clusters of leaves are present is high.

A system and method may apply a density operator to the high pass image to identify locations where high frequency changes are present, and may mark the centers of the locations. Generally, a density in an area as referred to herein relates to the number of white pixels in the area. The area may be defined by a size of a window used by the density operator. As described herein, white pixels may be generated by setting pixels to white (e.g., setting their gray level value to 255). For example, where small features that may represent leaves are detected, the relevant pixels are set to white.

In an embodiment, the density operator enables identifying locations where the density of leaves is above a threshold. For example, in an embodiment, the density operator is configured to match the size of a typical cluster of leaves based on the type of trees in the image.

Locations where meaningful high frequency changes exist may be denoted or defined as "potential leaves", "potential sets of leaves" or "potential clusters of leaves". For example, where leaves are present, the amount of white pixels (e.g., as set by the high pass filter to indicate high frequency changes) inside a window defined by the density operator may be relatively high. In an embodiment, based on one or more threshold values and a window size, the density operator may set a value of a central pixel in its window to a predefined value, for example, white (e.g., gray level value 255), and set other pixels in the window to another predefined value, for example, black (e.g., gray level value 0).

Accordingly, a system and method may set a pixel to either white or black (e.g., one of 255 or 0 gray level values) based on the content of a window centered around the pixel. A system and method may set a value of a pixel based on content in a widow around (or centered at) the pixel. For example, a system and method may iterate over some or all pixels in an image, for each of the pixels, examine a window (e.g., a 9×9 pixels pixel window) centered around the pixel, and set the pixels to either white or black based on the density of white pixels in the window.

For example, in a high pass image produced as described herein, the amount of white pixels in a potential cluster of leaves identified by the density operator may be relatively high compared to other or nearby areas in the image. In an embodiment, the density operator is applied according to one or more configuration parameters. For example, the density operator may be provided with a density value or threshold and may only identify potential clusters of leaves where the density of leaves is above the threshold.

A system and method may mark the centers of potential leaves or potential clusters of leaves. For example, a density operator may associate (or set) a central pixel in a potential cluster of leaves with (or to) a first predefined grayscale value and may set all other pixels to a second predefined grayscale value. For example, in an embodiment, a central pixel in a potential cluster of leaves is set to white (e.g., gray level 255) and pixels in other locations are set to black (e.g., gray level 0).

Figure 4:
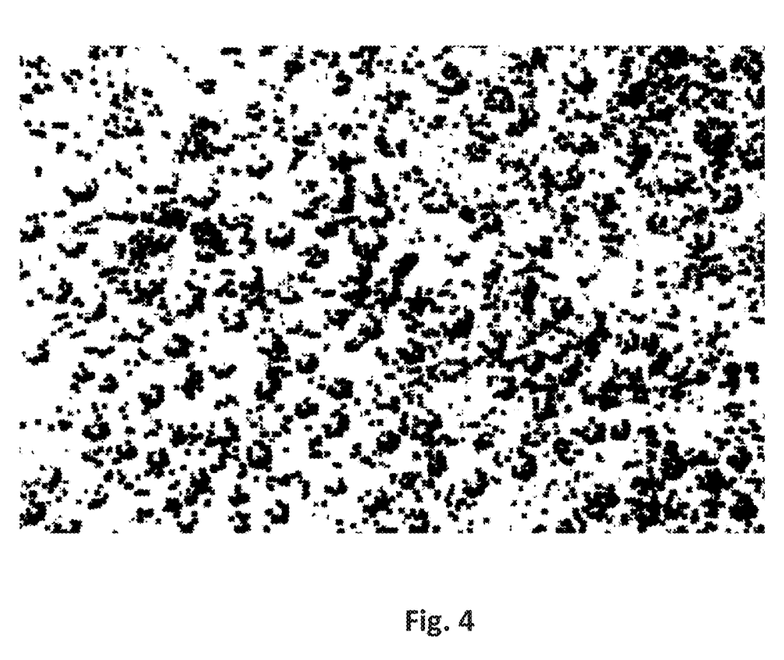
FIG. 4 shows an exemplary processed image according to some embodiments of the present invention.

Reference is made to FIG. 4 that shows an exemplary processed (output) image produced by a density operator according to some embodiments of the invention. As shown by FIG. 4, locations where higher densities of leaves are detected are indicated by white patterns and locations where lower densities of leaves are detected are set to black.

A system and method may define shapes around the centers of potential leaves or potential leaves clusters. In one embodiment, circular shapes are defined around the centers of locations where meaningful, high frequency changes exist, e.g., as identified by a density operator described herein. As described, a density operator may identify a center pixel and may mark the identified pixel, e.g., set the identified pixel to a predefined grayscale value. In an embodiment, circular shapes are defined around pixels marked by the density operator. The circular shapes may thus identify or mark leave piles (or potential leaves, sets of leaves or potential clusters of leaves).

Figure 5:
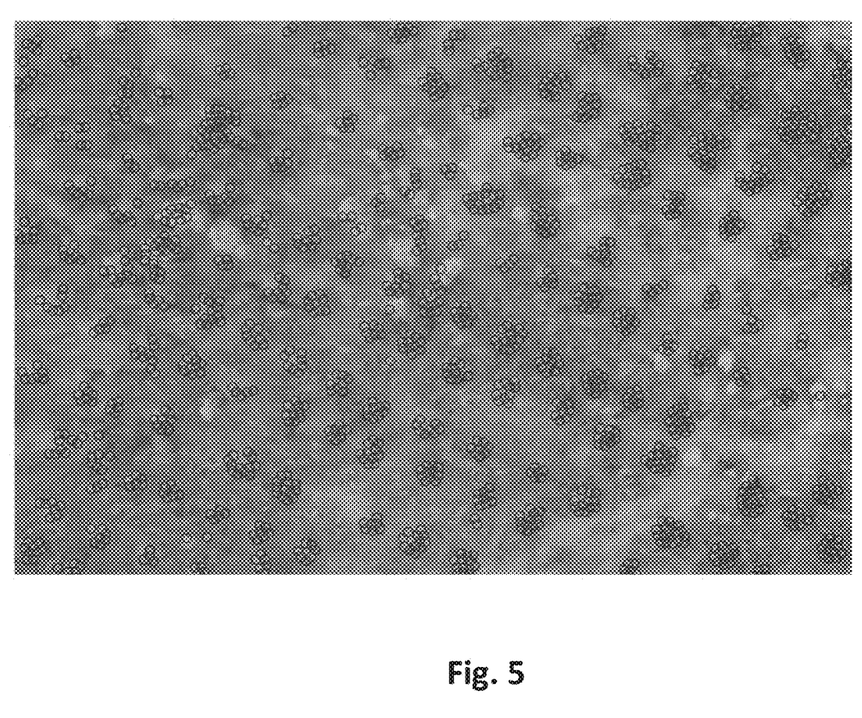
FIG. 5 shows an exemplary image according to some embodiments of the present invention.

Reference is made to FIG. 5 that shows an exemplary image produced by defining and/or drawing circular shapes around centers of potential clusters of leaves. Although circular shapes of relatively same size are shown in FIG. 5 it will be understood that other shapes and sizes may be used, e.g., square windows. For example, the size and geometry of shapes defined around centers of potential clusters of leaves may be according to information related to the specific trees in the input image, e.g., the type of trees, their condition and age, climate conditions etc. Any information that may be relevant to the way clusters of leaves may appear in an image may be used in order to define the geometry of shapes defined around centers of clusters of leaves as described herein.

In an embodiment, the shapes around (or that include or cover the) centers of clusters may be defined such that they do not overlapped, but, may be adjacent. In an embodiment, the shapes around centers of clusters may be a normalized or standard representation of clusters of leaves. For example, all clusters identified in an image may be represented using the same circular shape.

Although circles are mainly referred to herein, it will be understood that any standard or normalized shape may be used. Generally, a set of standard shapes may be used to represent an area where leaves are detected. For example, a set of adjacent circles may cover an area with leaves in an image. Any other shapes may be used to cover complex, non-regular areas or polygons that include or enclose clusters of leaves in an image A system and method may verify the circular (or other) shapes using a color signature. For example, in an embodiment, a reference color signature is prepared for the normalized circle using information obtained from the input image, e.g., information related to the vegetation and terrain in the input image. For example, the set of colors present in the input image at locations defined by the circular shapes may be used in order to define a color signature. For example, clusters of leaves of a specific tree typically have a well-defined color signature (e.g., green, orange etc.). Accordingly, once the color signature of clusters of leaves is known it may be used to verify or double check clusters of leaves as detected by embodiments of the invention.

For example, for each cluster of leaves identified as described herein, a method may examine, in a color image, the color signature of the area defined by the cluster and, if the color signature matches an expected color signature then the cluster may be considered and/or marked as verified. If a color signature of a cluster of leaves identified as described does not match a predefined color signature then the cluster may be removed, or ignored in further processing. A color signature may be defined and/or generated by analyzing an image or it may be generated using information related to trees in an image. For example, the information related to the color of leaves may be provided from sources other than an input image, e.g., based on the type of trees and time of year, the color of the trees in an image may be known and a color signature may be generated based on such knowledge.

A color signature may be used to represent a color pattern. A color signature may be used to represent and compare patterns of relatively low quality images (e.g., low resolution, noisy or smoothed images). In low quality images, a pattern may be best described or represented as a combination of colors. In an embodiment, the color space may be clustered into clusters where each is assigned its relative occurrence percentage. Due to the low quality of the images, as specified, the relative (geometric) location may be random and may not be regular, however, the combination of colors may be regular or defined and the combination may be repeated in the image. In an embodiment, the color signature may be the amount (percentage) of each color in a pattern. Different patterns may differ in contained colors and their relative amount (percentage). In an embodiment, to generate a color signature, colors identified or detected in an image are first clustered or grouped into categories and a color signature is generated based on groups of colors.

Accordingly, a color signature may be based, or generated according to a limited number of categories of colors or based on a few major colors. Generating or defining a color signature based on a small number of major colors may server to speed up a verification process described herein since only a limited number of colors may need to be compared or evaluated in order to verify a detected area as described herein. For example, candidate clusters of leaves may be verified by matching a limited set of colors with the colors in the candidate clusters.

A system and method may identify trees in an image. For example, canopies may be identified and based on canopy data such as size, center and shape, a tree may be identified and characterized. In particular, an identification of a tree includes the tree's location. An identification of a tree may include any relevant data, e.g., an age of a tree, a condition or health of a tree, the amount of lumber that may be produced from the tree and so on.

In an embodiment, circular shapes that include or indicate clusters of leaves are joined or grouped together to form canopies. For example, the location of circles in FIG. 5 may be recorded and canopies may be identified by grouping or joining together circles that intersect or overlap. Other rules or criteria for identifying trees or canopies may be used as described herein.

Figure 6:
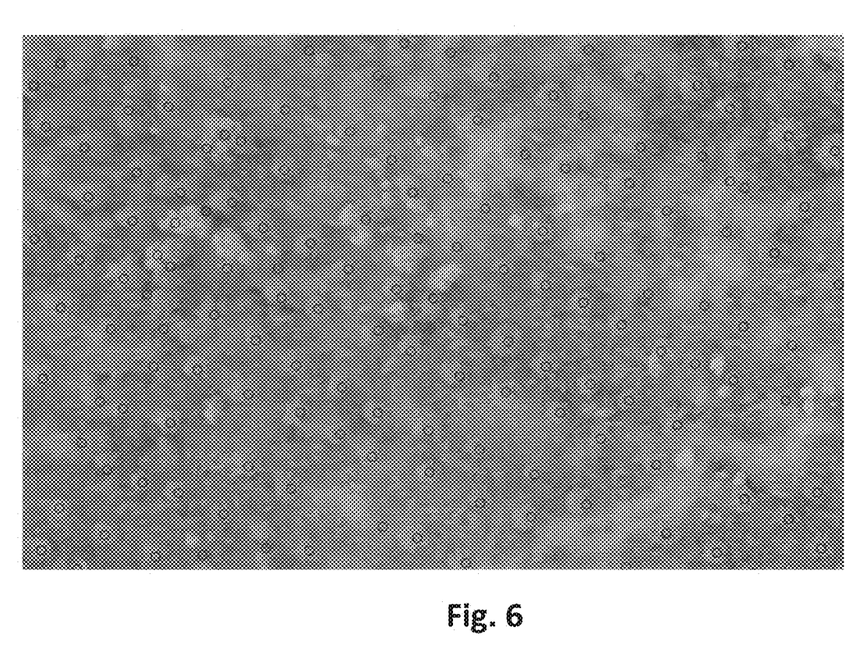
FIG. 6 shows an exemplary image according to some embodiments of the present invention.

Reference is made to FIG. 6 that shows an exemplary image according to some embodiments of the invention. As shown by FIG. 6, a group or set of circular shapes shown in FIG. 5 may be joined together and represented as a single circle or point. For example, the circles shown in FIG. 6 are trees (or centers of canopies) identified by grouping together circles shown in FIG. 5. Grouping or joining together of shapes such as circles that represent clusters of leaves may be done according to rules or criteria. For example, a rule may be a minimal or maximal distance of circles, e.g., such that only adjacent or intersecting circles are joined or grouped. Another rule may limit the number of circles to be joined together. For example, if the size of trees (and their canopies) in the input image is known, then a threshold of maximal circles in a group may be used (thus avoiding identifying two or more trees as a single tree). It will be understood that any thresholds or criteria may be used in a method of joining circles or other shapes as shown by FIG. 5 in order to identify trees as exemplified by FIG. 6.

Although known systems and methods may enable identifying objects in images where the objects are clearly distinguished from their background, e.g., by distinguishing colors, known systems and methods cannot identify trees as described herein, e.g., when the colors of the trees and surrounding area are similar. As described herein, by identifying clusters of leaves and further grouping the clusters using shapes (e.g., circles), a system and method according to embodiments of the invention enable detecting trees in an image that includes trees that are visually similar (e.g., have similar color) to the background of the image.

A system and a method according to some embodiments of the invention may identify planted areas. For example, after identifying trees as described herein (and exemplified by FIG. 6), regions where trees are present may be identified and, for example, a border line may be drawn around regions with trees. For example, a second density operator (that may use a second set of configuration parameters) may be applied to a processed image as shown by FIG. 6 and the second density operator may identify planted regions. For example, identifying planted regions (or regions where the density of trees is relatively high) may be performed by associating pixels included in the shapes (e.g., circles as described herein) with a first grayscale value and associating pixels outside the shapes with a second grayscale value and defining polygons, each of the polygons enclosing two or more of the shapes.

In an embodiment, to identify planted areas or regions where the density of trees is high, any pixel included in a normalized circle (a circle that identifies a tree or a cluster of leaves) is set to white (e.g., gray level value 255) and all other pixels in an image are set to another predefined value, for example, black (e.g., gray level value 0). Polygons are then defined such that they enclose one or more white circles. Defining the polygons may be according to a rule or criterion. For example, the maximal distance between white circles may be a threshold, criterion or rule used for including circles in a polygon.

Planted areas may first be identified by their leaves content. For example, the process of identifying planted regions may include determining that circles are overlaid or include piles of leaves. For example, after associating pixels included in the shapes gray level value 255 (white) and associating pixels outside the shapes with gray level value 0 (black), a planted area may be identified or defined by grouping together a set of white circles.

Figure 7:
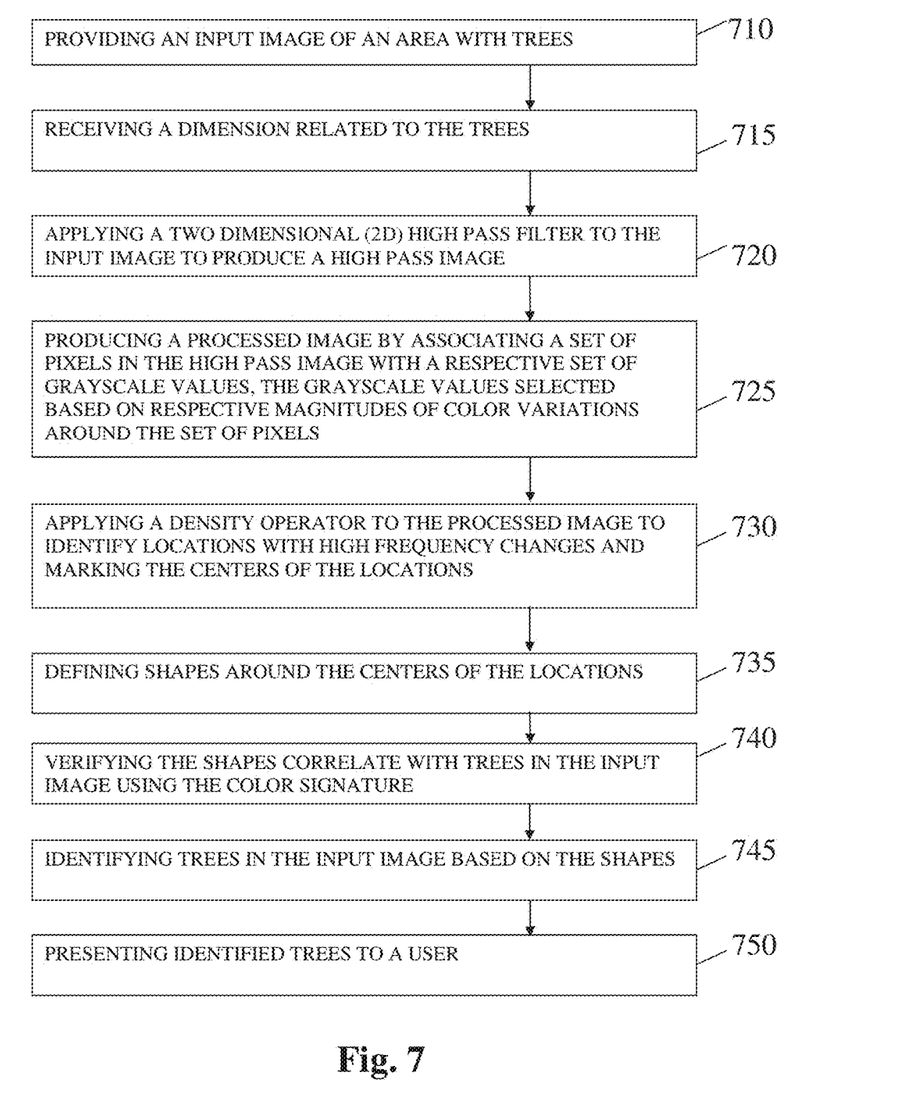
FIG. 7 is a flow diagram according to some embodiments of the present invention.

Reference is now made to FIG. 7, a flow diagram according to some embodiments of the invention. As shown by block 710, a method or flow may include providing an input image of an area with trees. For example, an image may be taken by a camera installed in an airplane and may capture a large area and a system or method according to some embodiments of the invention may automatically identify trees in the area including identifying the type of trees in the area, the distribution or location of trees in the area and so on.

As shown by block 715, a method or flow may include receiving a dimension related to the trees. A dimension related to the trees may be used as described herein in order to identify trees. For example, an average or typical size of leaves of trees to be identified may be provided. For example, if a need exists to identify or locate trees of a specific type in an area, then the size and/or color of leaves of the specific trees may be provided as input and used as described herein in order to determine whether or not trees of the specific type are present in the area. In an embodiment, a size of leaves is used in order to configure a filter as described herein.

As shown by block 720, a method or flow may include applying a 2D high pass filter to the input image to produce a high pass image. As described, the 2D filter may be configured according to the provided or input dimension. For example, the 2D filter may be configured to detect changes in intensity present in a small area in the image, e.g., an area the size of a leaf.

Although the discussion herein mainly refers to leaves other configurations may be contemplated. For example, an input dimension may be a dimension of branches of trees and an embodiment may identify trees as described herein by first identifying branches, then identifying clusters of branches and further identifying trees based on clusters of branches. Accordingly, it will be understood the present discussion is applicable and relevant to branches of trees as it is to leaves. For example, input to a method of identifying trees in an image may include color and size of branches and the method may otherwise be similar to methods described herein.

As shown by block 725, a method or flow may include producing a processed image by associating a set of pixels in the high pass image with a respective set of grayscale values, the grayscale values selected based on respective magnitudes of color variations around the set of pixels. For example, after identifying changes in intensity as described, pixels suspected as representing leaves may be set to white.

As shown by block 730, a method or flow may include applying a density operator to the processed image to identify locations with high frequency changes and marking the centers of the locations. For example, clusters of leaves may be identified by identifying white pixels (e.g., pixels set to white as described herein).

As shown by block 735, a method or flow may include defining shapes around the centers of the locations. For example, circles may be drawn around clusters of white pixels.

As shown by block 740, a method or flow may include verifying the shapes correlate with trees in the input image using the color signature. A color signature may be produced by analyzing the colors of a tree. For example, a color signature of a first tree may include specific levels, intensities or percentages of red, green and blue and a color signature of a second tree may include other, or different, levels of red, green and blue.

Using an input color signature (that may be related to a specific tree type) and a color image of the area, a circle or other shape drawn or defined as described may be verified by ascertaining that the color signature of a corresponding shape in the color image is the same as the input color signature.

As shown by block 745, a method or flow may include identifying trees in the input image based on the shapes. For example, using a rule or criteria, circles may be grouped to form trees. For example, intersecting circles may be joined together into a composite shape or region and the resulting shape or region may be identified as a tree. As shown by block 745, a method or flow may include presenting identified trees to a user. For example, an image of an area may be presented on a monitor of a computer and the identified trees may be indicated in the image, e.g., as shown by FIG. 6.

Some embodiments may be provided in a computer program product that may include a non-transitory machine-readable medium, with stored thereon instructions, which may be used to program a computer, or other programmable devices, to perform methods as disclosed herein. Some embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein. The storage medium may include, but is not limited to, any type of disk including optical disks, compact disk (CD), semiconductor devices such as read-only memories (ROMs), random access memories (RAMs), flash memories, electrically erasable programmable read-only memories (EEPROMs) or any type of media suitable for storing electronic instructions, including programmable storage devices. For example, memory 120 may be a non-transitory machine-readable medium.

A system according to some embodiments of the invention may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a notebook computer, a workstation, a server computer, a network device, or any other suitable computing device. For example, a system as described herein may include one or more devices such as computing device 100.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of detecting trees in an image, the method comprising:
   providing an input image of an area with trees;
   receiving at least one dimension related to the trees;
   applying a two dimensional (2D) high pass filter to the input image to produce a high pass image, wherein the 2D high pass filter is configured to mark objects based on the at least one dimension;
   producing a processed image by associating a set of pixels in the high pass image with a respective set of grayscale values, the grayscale values selected based on respective magnitudes of color variations around the set of pixels;
   applying a density operator to the processed image to identify locations with high frequency changes and marking the centers of the locations;
   defining shapes around the centers of the locations;
   identifying canopies by grouping two or more shapes; and
   identifying trees based on at least one of: identifying trees in the high pass image by identifying clusters of marked objects and identified canopies.

2. The method of claim 1, comprising:
   receiving a first dimension related to a first tree type and a second dimension related to a second tree type;
   applying the two dimensional (2D) high pass filter to the input image to produce a high pass image, wherein the 2D high pass filter is configured to detect objects based on the first dimension and based on the second dimension; and
   identifying, in the high pass image, trees of the first type and trees of the second type by respectively identifying clusters of objects related to the first tree type and clusters of objects related to the second tree type.

3. The method of claim 1, wherein the at least one dimension related to the trees is a size of leaves.

4. The method of claim 1, comprising:
   receiving a color signature related to the trees; and
   verifying the shapes correlate with trees in the input image using the color signature.

5. The method of claim 1, wherein the shapes are one of: circles and ellipses.

6. The method of claim 1, comprising associating pixels included in the shapes with a first grayscale value and associating pixels outside the shapes with a second grayscale value.

7. The method of claim 1, comprising identifying planted areas by defining polygons, each of the polygons enclosing two or more of the shapes.

8. A system for detecting trees in an image, the system comprising:
- a memory; and
- a controller, the controller configured to:
- receive an input image of an area with trees,
- receive at least one dimension related to the trees,
- apply a two dimensional (2D) high pass filter to the input image to produce a high pass image, wherein the 2D high pass filter is configured to detect and mark objects based on the at least one dimension,
- produce a processed image by associating a set of pixels in the high pass image with a respective set of grayscale values, the grayscale values selected based on respective magnitudes of color variations around the set of pixels,
- apply a density operator to the processed image to identify locations with high frequency changes and marking the centers of the locations,
- define shapes around the centers of the locations,
- identify canopies by grouping two or more shapes, and
- identify trees based on at least one of: identifying trees in the high pass image by identifying clusters of marked objects and identified canopies.

9. The system of claim 8, wherein the controller is configured to:
- receive a first dimension related to a first tree type and a second dimension related to a second tree type;
- apply the two dimensional (2D) high pass filter to the input image to produce a high pass image, wherein the 2D high pass filter is configured to detect and mark objects based on the first dimension and based on the second dimension; and
- identify, in the high pass image, trees of the first type and trees of the second type by respectively identifying clusters of objects related to the first tree type and clusters of objects related to the second tree type.

10. The system of claim 8, wherein the at least one dimension related to the trees is a size of leaves.

11. The system of claim 8, wherein the controller is configured to:
- receive a color signature related to the trees; and
- verify the shapes correlate with trees in the input image using the color signature.

12. The system of claim 8, wherein the shapes are one of: circles and ellipses.

13. The system of claim 8, wherein the controller is configured to associate pixels included in the shapes with a first grayscale value and associating pixels outside the shapes with a second grayscale value.

14. The system of claim 8, wherein the controller is configured to identify planted areas by defining polygons, each of the polygons enclosing two or more of the shapes.

15. A method of identifying trees in an image, the method comprising:
- receiving at least one dimension related to the trees in an input image;
- applying a two dimensional (2D) high pass filter to the input image to produce a high pass image, wherein the 2D high pass filter is configured to detect objects based on the at least one dimension;
- producing a processed image by associating a set of pixels in the high pass image with a respective set of grayscale values, the grayscale values selected based on respective magnitudes of color variations around the set of pixels;
- applying a density operator to the processed image to identify locations with high frequency changes and marking the centers of the locations;
- defining shapes around the centers of the locations;
- identifying canopies by grouping two or more shapes; and
- identifying trees based on at least one of: identifying trees in the high pass image by identifying clusters of detected objects and identified canopies.

16. The method of claim 1, comprising:
- receiving a first dimension related to a first tree type and a second dimension related to a second tree type;
- applying the two dimensional (2D) high pass filter to the input image to produce a high pass image, wherein the 2D high pass filter is configured to detect objects based on the first dimension and based on the second dimension; and
- identifying, in the high pass image, trees of the first type and trees of the second type by respectively identifying clusters of objects related to the first tree type and clusters of objects related to the second tree type.

17. The method of claim 1, comprising:
- producing a processed image by associating a set of pixels in the high pass image with a respective set of grayscale values, the grayscale values selected based on respective magnitudes of color variations around the set of pixels;
- applying a density operator to the processed image to identify locations with high frequency changes and marking the centers of the locations;
- defining shapes around the centers of the locations; and
- identifying canopies by grouping two or more shapes.

18. The method of claim 17, comprising:
- receiving a color signature related to the trees; and
- verifying the shapes correlate with trees in the input image using the color signature.

* * * * *